No. 846,182. PATENTED MAR. 5, 1907.
J. H. BOUGHTON.
VARIABLE SPEED TRANSMISSION MECHANISM.
APPLICATION FILED AUG. 2, 1906.
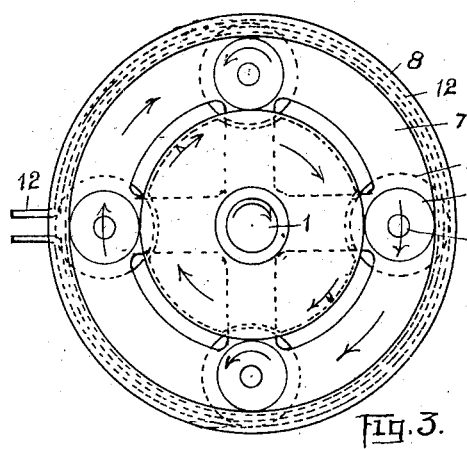
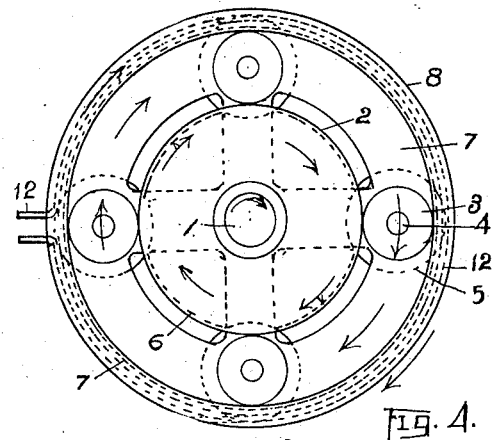
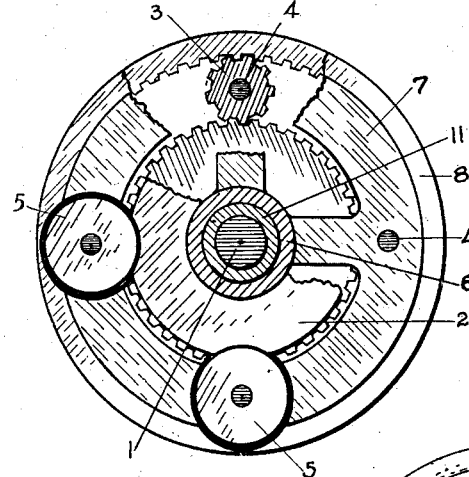
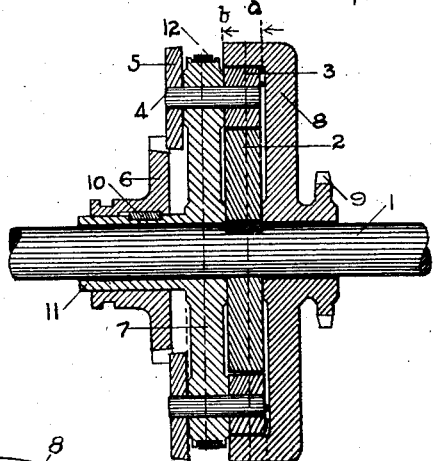
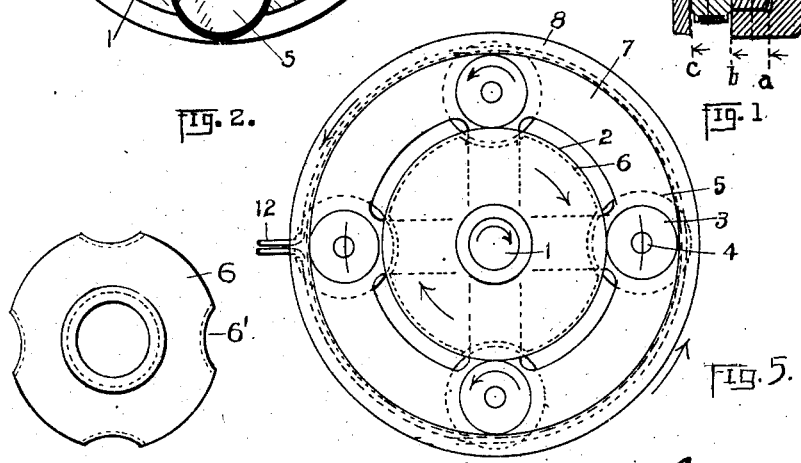

UNITED STATES PATENT OFFICE.

JUDSON H. BOUGHTON, OF NEW YORK, N. Y.

VARIABLE-SPEED TRANSMISSION MECHANISM.

No. 846,182.

Specification of Letters Patent.

Patented March 5, 1907.

Application filed August 2, 1906. Serial No. 328,942.

*To all whom it may concern:*

Be it known that I, JUDSON H. BOUGHTON, a citizen of the United States, residing at New York, in the county of New York, and State of New York, have invented certain new and useful Improvements in Variable-Speed Transmission Mechanism, of which the following is a specification.

My invention relates to an improved variable-speed transmission mechanism susceptible of simple and compact construction, and more especially adapted for use on self-propelled vehicles or boats, by means of which reversal of motion and change of speed may be effected by a simple movement of the controlling-lever or levers and without undue jar, shock, or strain.

In its generic nature my invention comprehends a combination of annular, sun, and planet gears, together with a band-brake, clutch, and other necessary parts arranged to transmit from a motor or other power shaft motion varying from zero to full speed in one direction, the latter produced by a condition of positive contact, and from zero to a reduced speed in the opposite direction, the latter produced by a similar condition, all at the will of the operator.

My invention includes a means of allowing the motor-shaft to rotate freely without imparting motion to the sprocket-wheel of the transmission from which power is to be taken; a means of imparting to the sprocket-wheel motion in a given direction, varying from full speed to zero or the reverse, the full speed being produced by a condition of positive contact; and a means of imparting to the sprocket-wheel motion in the opposite direction, varying from zero to a certain reduced speed, the latter likewise produced by a condition of positive contact.

The invention comprises the peculiar construction and arrangement of a sun-gear fixedly attached to a motor-shaft which drives an annular gear or follower loosely mounted on the shaft through interposed planet-gears, whose revolution about the said shaft and rotation around their respective shafts determine the direction and rate of the motion imparted to the said annular gear or follower, and these are properly restrained and controlled by a band-brake and a cone-brake, respectively.

In the accompanying drawings, Figure 1 is a central vertical longitudinal section of my variable-speed mechanism. Fig. 2 is a central vertical section the upper portion of which is taken on the line $a\,a$, the right-hand portion on lines $b\,b$, and the lower portion on lines $c\,c$; Figs. 3, 4, and 5, diagrammatic views of the different elements in operative relation, and Fig. 6 view of the inner side of the clutch disk.

In constructing my invention I provide the usual motor-shaft, on which is rigidly keyed a driving-pinion or sun-gear 2, meshing with the planet-gears 3, of which there may be two or more, four of them being shown herein. These planet-gears 3 mesh in turn with the internal-toothed annular gear 8, which is loosely mounted on shaft 1 and from which power is delivered by the sprocket-wheel 9 or by any other suitable means and are supported by and fixedly attached to shafts 4, which are carried by a brake-wheel 7, the latter being loosely mounted on the shaft 1 and has a sleeve extension 11. The clutch-disk 6 is mounted on the sleeve extension 11 and is prevented from revolving thereon by the key 10; but at the same time it may be axially moved on the sleeve so as to engage the clutch wheels or cones 5, which are fixedly attached to the shafts 4. The disk 6 has circular recesses 6' so located that as the clutch-disks engage they rest in these recesses, and thus provide a more effective brake and cause less wear than if they were permitted to bear against the rim of the disks. I also provide the usual band-brake 12 on the brake-wheel 7.

The transmission mechanism operates as follows: When the planet-gears 3 are free to rotate about their respective axes and when the brake-wheel 7, which supports them, is free to rotate about the motor-shaft 1, the latter may be driven at any speed without imparting motion to the annular gear 8, to which the sprocket-wheel 9 is fixedly attached. Diagram Fig. 3 represents this condition which obtains when both the band-brake 12 and the clutch 6 are disengaged, and it permits the motor-shaft 1 to be driven without affecting the said annular gear or follower. If when the said shaft 1 is revolving the controlling-lever be moved so that the clutch-disk 6 gradually engages the clutch-cones 5, Diagram 4, tending to retard their axial rotation, a gradually-increasing motion in the same direction will be imparted to the annular gear 8 until finally when the axial rotation of the said clutch-cones 5 entirely ceases, with a condition of positive contact with the said clutch-disks 6, the said annular gear 8 will assume an annular speed equal to that of the driving-gear 2, all parts of the transmission being at rest with respect to each other. If when the shaft 1 is revolving, as in Diagram 5, the controlling-lever be moved so that with the clutch 5 6 disengaged the band-brake 12 will grip the brake-wheel 7 with gradually-increasing pressure, tending to retard the revolution of the said wheel 7, gradually increasing motion will be imparted to the annular gear 8 and follower through the planet-gears 3, but in a reversed direction, until finally when the wheel 7 entirely ceases to revolve about its axis a condition of positive contact will prevail and the annular gear 8 and follower will be driven in the reversed direction at a speed reduced to the ratio of the number of teeth of the driving sun-gear 2 to those of the annular gear 8.

While I prefer to arrange the various parts as shown and described, it is obvious that the details of construction may be modified without departing from the spirit of my invention.

What I claim as new is—

1. A variable-speed mechanism comprising a motor-shaft, a sun-gear mounted to rotate therewith, a loosely-mounted brake-wheel adjacent said sun-gear, planet-gears mounted on said brake-wheel and meshing with said sun-gear, disks mounted to rotate with said planet-gears, an annular gear having internal teeth meshing with said planet-gears, and means for engaging the peripheries of said disks to vary the speed of said planet-gears.

2. A variable-speed mechanism comprising a motor-shaft, a sun-gear mounted to rotate therewith, a loosely-mounted brake-wheel adjacent said sun-gear, planet-gears mounted on said brake-wheel and meshing with said sun-gears, disks mounted to rotate with said planet-gears, an internally-toothed gear meshing with said planet-gears, means for holding the brake-wheel from rotation, and means engaging the peripheries of said disks to prevent rotation of said planet-gears.

3. A variable-speed mechanism comprising a motor-shaft, a sun-gear mounted to rotate therewith, a loosely-mounted brake-wheel adjacent said sun-gear, planet-gears mounted on said brake-wheel and meshing with said sun-gear, disks mounted to rotate with said planet-gears, an internally-toothed gear meshing with said planet-gears, means for holding the brake-wheel from rotation, and a clutch-wheel for engaging the peripheries of said disks to prevent rotation of said planet-gears.

4. A variable-speed mechanism comprising a motor-shaft, a sun-gear mounted to rotate therewith, a loosely-mounted brake-wheel adjacent said sun-gear, planet-gears mounted on said brake-wheel and meshing with said sun-gear, disks mounted to rotate with said planet-gears, an internally-toothed gear meshing with said planet-gears, means for holding the brake-wheel from rotation, and a clutch-wheel having its periphery provided with recesses to engage the peripheries of said disks to prevent rotation of said planet-gears.

5. A variable-speed transmission-gearing, comprising a motor-shaft, a sun-gear fixedly mounted thereon, a loose brake-wheel on one side, planet-wheels engaging with the sun-gear, each planet-gear being mounted on a stub-shaft passing through said brake-wheel a cone-clutch on the opposite end of each stub-shaft, an internal-toothed annular gear on the other side of the sun-gear, loose on the shaft, and also engaging with the planet-gears, and a clutch-disk by the side of the brake-wheel and adapted to turn therewith and to engage with the cone-clutches.

6. A variable-speed transmission mechanism, comprising a motor-shaft, a sun-gear keyed thereto, an internal-toothed annular gear on one side, a sprocket-wheel, a brake-wheel on the other side of the sun-gear loosely mounted on the shaft, and having a tubular sleeve, a plurality of planet-gears mounted on loose stub-shafts through said brake-wheel, said planet-gears engaging with the sun and annular gears, cone-clutches on the outer ends of the stub-shafts, and a clutch-disk slidably mounted on the sleeve of the brake-wheel and adapted to engage with the cone-clutches, as set forth.

In testimony whereof I affix my signature in presence of two witnesses.

JUDSON H. BOUGHTON.

Witnesses:
ERNEST A. RABENER,
J. S. ZERBE.